Jan. 17, 1950     E. W. MOLLOY     2,495,072
VACUUM TUBE CIRCUIT
Filed Jan. 3, 1949
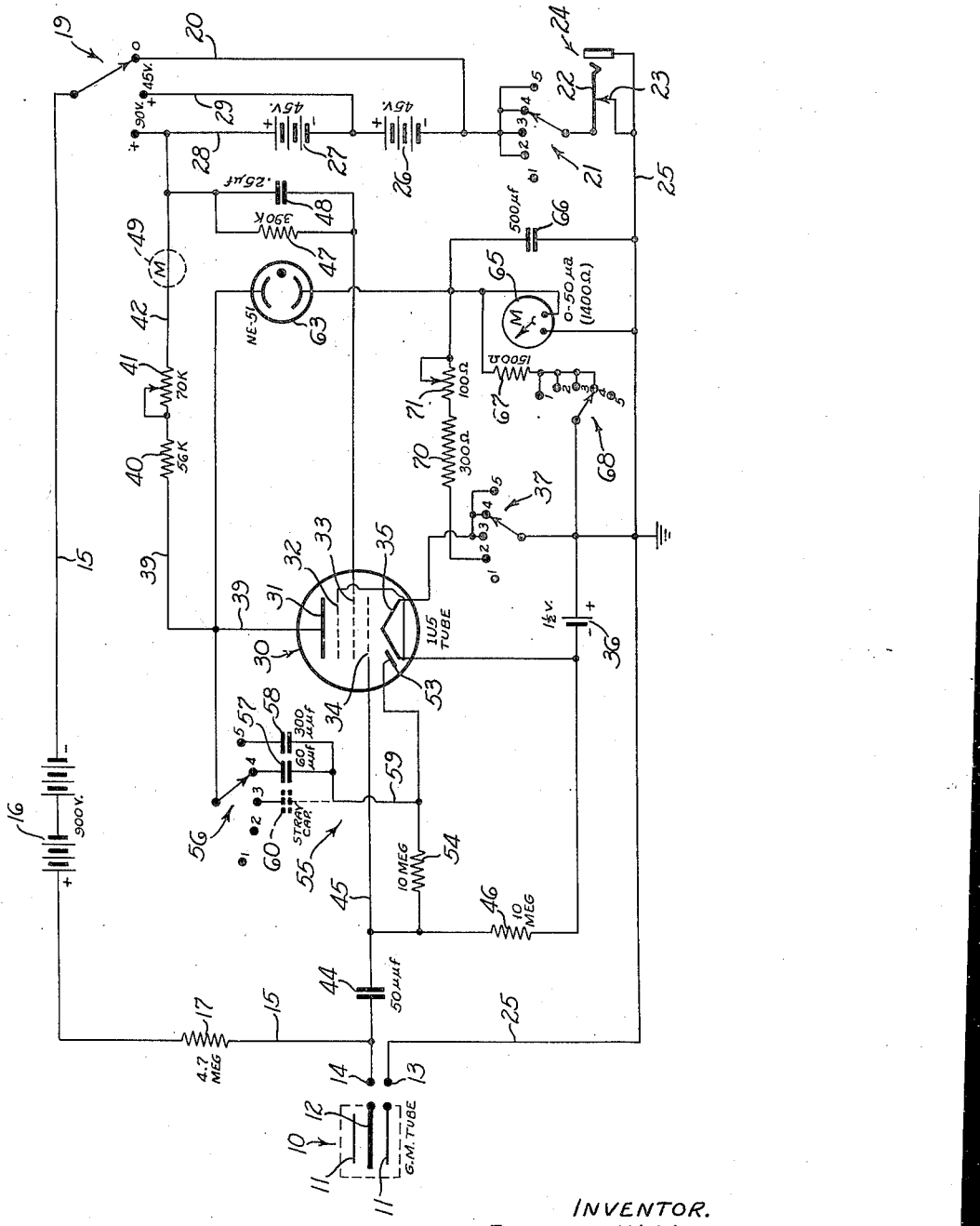
INVENTOR.
EVERETT W. MOLLOY
BY HIS ATTORNEYS.
HARRIS, KIECH, FOSTER & HARRIS
By Clarence F. Kiech Patented Jan. 17, 1950

2,495,072

UNITED STATES PATENT OFFICE 2,495,072

VACUUM TUBE CIRCUIT

Everett W. Molloy, Pasadena, Calif., assignor to National Technical Laboratories, South Pasadena, Calif., a corporation of California Application January 3, 1949, Serial No. 68,835

22 Claims. (Cl. 250—83.6)

My invention relates to the counting of electric pulses or undulations and more particularly to a circuit or device for indicating the rate at which such pulses are received by an input circuit. The invention is well adapted to the counting of the reception rate of radiation pulses when associated with a radiation-responsive device such as a Geiger-Mueller tube and will be particularly described in this connection, although it can be used in other arrangements for integrating or counting pulses or indicating pulse rates or frequency whether the pulses are of uniform or non-uniform time length or magnitude and whether the pulses are spaced substantially uniformly or randomly.

In measuring radiation by a Geiger-Mueller tube, random electric pulses of somewhat variable or non-uniform size are produced and it is desirable to measure the average or integrated average rate of production of the pulses as an indication of radiation intensity. If amplified pulses of the same length as those received are delivered directly to a meter, these will cause undue fluctuations, particularly when the number of pulses per unit of time is small.

It is an object of the invention to prolong the amplified pulses, relative to the length of the received pulse, and use such prolonged pulse in the desired measurement.

A further object is to convert narrow unidirectional pulses into broader unidirectional pulses or undulations which can be averaged to give a steady indication of the rate of reception of pulses.

It is another object of the present invention to provide a circuit, which can receive pulses of different size and which will produce output undulations or pulses of uniform size at an instantaneous rate corresponding to the reception rate or in step with the received pulses.

Another object is to integrate such uniform-size output undulations or pulses to produce an indication of the average rate of pulse reception at any instant of time whether the received pulses are of the same or random size or magnitude.

Another object is to provide a power amplifying circuit that can be overdriven in the sense that a circuit element, typically an electron tube, responds only to the initial part of a signal or pulse, a portion of the amplified energy being delivered to a means for maintaining the amplifying means in overdriven state for a time greater than the maximum length of the received signal and of length determined primarily by the constants of the circuit. The resulting output of the amplifying means can then be integrated in a manner to obtain an indication of the instantaneous rate of reception of the pulses.

Another object is to provide triggered means for establishing in an output circuit an undulation of a time length greater than the longest pulse to be measured and to employ the incoming pulses to trigger such means to create uniform size undulations therein in step with incoming pulses which may vary in size.

A further object is to provide a convenient arrangement, for a series of ranges of indication, of varying sensitivity of the circuit.

Another object is to provide a convenient way of standardizing circuit sensitivity to compensate for amplifier battery voltage variation during the life of the batteries.

A further object of the invention is to provide an extremely simple circuit for accomplishing such results—a circuit which can employ a single grid-controlled tube to produce a substantially steady indication of the instantaneous rate of reception of pulses.

Further objects and advantages of the invention will be evident from the following description of the invention exemplified in relation to a radiation measuring device.

The drawing is a wiring diagram illustrating the preferred embodiment of the invention, but suggesting variants that can be used without departing from the spirit of the invention.

The drawing shows a Geiger-Mueller (G. M.) tube 10 of the standard self-quenching type having grounded and insulated electrodes 11 and 12 and adapted to deliver a negative pulse to the circuit of the invention each time a unit of radiation reaches the tube from or through the surrounding environment. The electrodes 11 and 12 are adapted to be connected respectively to input terminals 13 and 14 of the circuit.

The requisite energizing potential for the G. M. tube 10 may be derived from any suitable source but this source is shown as a part of the circuit and as comprising the following elements: Connected in an energizing conductor 15 extending from the input terminal 14 is a high-voltage battery 16 and a resistor 17, the battery being of about 900 volts and the conductor 15 extending to the arm of a three-position selector switch 19. When this arm is in the position shown, it connects with a conductor 20 extending to interconnected contacts corresponding to the last four positions of a five-position selector switch 21 and thence through normally-closed contacts 22, 23 of a jack switch 24 to a grounded conductor 25 connected to the input terminal 13. Batteries 26 and 27, typically 45-volts each, are connected serially to the selector switch 21 and, by a conductor 28, to the 90-volt contact of the selector switch 19, the 45-volt contact of the switch being connected by a conductor 29 to the serial connection intermediate the batteries. Moving the arm of the selector switch to its intermediate or left-hand position adds respectively 45-volts and 90-volts to the supply of the G. M. tube 10, thus permitting adjustment in its energizing potential.

The invention employs a pulse-broadening means shown as including an electron tube 30 which may be a pentode tube having a plate 31, a suppressor 32 internally cathode-connected, a screen 33, a control grid 34 and a cathode 35. The cathode is energized from a battery 36 when a five-position selector switch 37 is in its third, fourth or fifth positions, the arm of this switch being grounded to the grounded conductor 25. The plate 31 is connected by a conductor 39 to serially-connected plate resistors 40, 41, the latter being adjustable and being connected to the 90-volt contact of the selector switch 19 through a conductor 42. The negative pulses are supplied to the control grid 34, here shown as operated at substantially zero bias by way of example, through a small condenser 44 connected to the grid by a conductor 45. A grid resistor 46 is connected between the grid conductor 45 and the negative terminal of the battery 36 to complete the grid circuit. The potential for the screen 33 is taken from the plate supply through a resistor 47 shunted by a condenser 48.

If a sensitive, highly-damped microammeter is connected in the conductor 42, as shown by dotted lines 49, the circuit thus far described can be made to indicate an approximate average rate of pulse reception, over a limited range of rates. With such an arrangement, the operation is as follows:

Each negative pulse from the G. M. tube 10 is large enough to cut off the plate current of the tube 30. When no pulse is present the plate potential is not equal to the sum of the potentials of the batteries 26 and 27 but is less than this sum by the I. R. drop in resistors 40 and 41. However, upon cut-off of the plate current, by arrival of a pulse, the plate potential rises with a slight time lag determined by the inductance and stray capacitances of the plate circuit, including the meter at 49. As the pulse dies out, the grid 34 becomes more positive and again starts the flow of plate current, with consequent reduction in plate voltage, again with a slight time lag. With the meter set to read full scale with no pulse, the reception of a pulse will decrease the meter current for a time that may be slightly longer than the length of the pulse, thus giving somewhat improved action as compared with mere amplification of the pulse. By adding further capacitance for smoothing the pulses, reasonably smooth meter action can be obtained. However, it must be noted that, since the tube plate current is cut off only for a time not exceeding the pulse duration, the sensitivity of the circuit, defined as the fractional decrease of no-signal current, cannot exceed $$\frac{nt_p}{t}$$

where $n$ is the number of pulses in time $t$, each pulse having a duration of $t_p$.

A far superior action can be obtained by incorporating in the circuit thus far described, a further means for broadening the amplified undulation or pulse. The pentode elements of the tube 30 act as a power amplifying means which can be triggered or overdriven in the sense that it responds only to the initial part of the received signal or pulse, e. g., only that part of the pulse which is sufficient to cut off the plate current. Any later part of the pulse, beyond cut-off, has no effect and the then output of the tube 30 is thus independent of pulse size above a minimum pulse size. The preferred embodiment of the invention includes a means for maintaining the amplifying means in its overdriven state for a time greater than the time length of the maximum-length signal or pulse to be received, together with a means for integrating the changes in plate potential over a period of time as a measure of the rate at which the pulses are received.

Such means includes means for using a portion of the amplified output of the tube 30 for maintaining it in overdriven state for an interval of time. This means preferably includes a time-delay circuit, preferably with an adjustable time constant to control sensitivity, in association with an asymmetrical impedance, typically a rectifier means. The rectifier means can be separate from the tube 30 but is preferably a diode section thereof, including a diode plate 53 receiving electrons from the cathode 35. The diode plate 53 is connected to the control grid 34 through a time-delay or pulse-isolating resistor 54, forming a part of a time-delay circuit 55. The time-delay circuit includes a five-position selector switch 56 having an arm connected to the plate 31 through the conductor 39. Condensers 57 and 58, of different capacity, have interconnected terminals joined by conductor 59 to the diode plate 53 and other terminals respectively connected to the contacts corresponding to the fourth and fifth positions of the selector switch 56. Dotted-line condenser 60, shown at the third position, represents merely the stray capacity between the pentode and diode plates 31 and 53 and the circuits connected thereto, this stray capacity also being present when the selector switch is in its first and second positions.

With the selector switches in the positions shown, the operation of the circuit is as follows: The arrival of a negative pulse cuts off the plate current and the plate potential rises. This increase in potential is of a transient nature and is transmitted to the diode plate 53 through the condenser 57, initiating or increasing the current in the diode section of the tube 30. This charges the condenser 57. The transient current from the plate 31 through the condenser finds a much lower resistance path to ground through the diode section of the tube than through the resistors 54 and 46. As a consequence, the upper plate of the condenser is charged with a relatively high positive charge, while the lower plate is only weakly charged due to the low-resistance path through the diode which drains the charge from the lower condenser plate.

The rise in potential of the pentode plate 31 thus creates a signal to the diode section which continues until the potential of the pentode plate stops rising. This signal, however, has substantially no effect on the grid potential since the diode provides a low impedance path for current flow to the cathode. When the pentode plate potential starts to fall, the lower plate of the condenser 57 swings strongly negative, thus swinging the plate 53 of the diode negative and blocking current flow through the diode so that the diode provides a high impedance path for current flow to the cathode. The condenser 57 discharges through the pulse isolating resistor 54 and the grid resistor 46, thus producing a negative signal on the grid 34 and keeping same near cut-off potential for a further interval of time and thus permitting the potential of the plate 31 to remain essentially at its high potential for such interval of time. By varying the size of the plate to diode condenser, e. g., by shifting the selector switch 56 to the fifth position to bring into circuit the higher-capacity condenser 58, the tube 30 may be kept near cut-off for a longer interval of time, this time being approximately the time the grid is held at or below cut-off by the negative pulses from the Geiger-Mueller tube plus the time for the condenser 58 to discharge sufficiently to cause the grid potential to relax from the cut-off condition toward its initial bias. This change in capacity of the coupling circuit represents the method of changing the sensitivity of the circuit.

With such a system, a sensitive microammeter, placed as indicated by dotted lines 49, can be used to integrate the prolonged output undulations from the tube 30 and the circuit will then operate as described immediately above. If such a meter is set to read full scale in the absence of radiation pulses, each prolonged cut-off period, established by a pulse of radiation, reduces the meter reading and if the meter response is sufficiently highly damped, as by shunting it by a capacitor, the successive cut-off periods will be averaged to produce an average reading differing from full-scale reading by an amount substantially proportional to the average rate of reception of pulses. However, a reverse scale is required and I prefer to adapt the system to direct reading by employing a separate meter circuit constructed as follows:

In the preferred circuit, a gaseous discharge tube, typically a neon bulb 63 is connected in a meter circuit between the plate 31 and the grounded conductor 25, this circuit including a microammeter 65 shunted by a smoothing condenser 66. The meter is also shunted by a resistor 67 through a five-position selector switch 68 when in all positions except the fifth, which is open. For test or adjustment, the meter 65 is also shunted by series-connected fixed and variable resistors 70 and 71 when the selector switch 37 is in its second or cathode-deenergizing position, the first position of this selector switch being open. If desired, a vacuum tube voltmeter can be used in the circuit instead of the microammeter described.

With such a meter circuit, a pulse-created rise in plate potential, arising from a decrease in zero-signal grid potential, will continue only until the firing potential of the neon bulb is reached, whereupon the bulb will pass current through the meter 65 and the plate potential will drop to near but just above the extinction potential of the neon bulb, remaining there until the grid 34 again approaches its initial zero-signal or approximately-zero bias condition and assumes control of the tube to increase the plate current and decrease the plate potential, applied to the neon bulb 63, to extinguish the neon bulb.

This circuit differs from the previously described circuit, which lacks the neon tube, because the plate potential does not remain at the potential approximately equal to the battery supply potential throughout the duration of the initiating pulse. Instead, it at once reverses in direction, driving the diode to cut off its current flow and initiating the discharge of the capacity between the pentode plate and diode plate through the resistors 54 and 46. By this means the pentode grid can be held below cut-off for a substantial period of time. As the grid relaxes toward cut-off its rate of relaxation can thus be higher than with the previous circuit. The circuit therefore recovers to essentially its starting or zero-signal condition at a more rapid rate than would be achieved if the neon tube were omitted.

Since the pentode section of the tube 30 has high voltage gain, the plate voltage excursion available, rather than the amplification, determines the quantity of charge drawn through the diode section and hence the duration of the time interval the pentode plate current is cut off. The incoming pulse has merely to exceed the value required to raise the plate potential to the firing value of the neon bulb 63 to initiate and establish the longer-duration flow through the neon bulb and the meter 65 which exists for a definite period of time, irrespective of the duration of the original pulse. The circuit is thus reasonably independent of the magnitude or duration of the initiating pulse.

The meter 65 measures the average current flow through the neon bulb 63. Since this current pulsates at the frequency of pulse reception, the condenser 66 is placed across the meter to increase the response period of the meter circuit. The filtering action of the response period is determined by the resistance and inductance of the meter coil and the size of the condenser 66, which should be of relatively large capacity, an electrolytic condenser being suitable since the voltage and leakage requirements are not severe. In practice, the reading of the meter is quite steady over a wide range of random pulse frequencies and is independent of pulse magnitude over a wide range.

If an audible indication of pulse reception is desired, a pair of magnetic-type earphones may be plugged into the jack 24. There is sufficient energy in the plate circuit to directly drive magnetic-type earphones which are less expensive and more durable than earphones of the crystal type.

The tube 30 may be of the 1U5 type and the neon bulb of the NE51 type. The meter 65 may be of the 0-50 microampere type, having a resistance of 1400 ohms and being calibrated (forward reading) in terms of radiation received per unit of time. Typical values of capacity and resistance are suggested on the drawing. Also, the selector switches 21, 37, 56 and 68 are mounted on a common shaft or otherwise simultaneously operated. The first position of each is on off position, the second position is a test position and the third, fourth and fifth positions are respectively for 20, 2 and 0.2 mr./hr. (milli-Roentgen units per hour) ranges.

The potential applied to the pentode plate 31 with no signal on the grid 34 should be below the extinction potential of the neon bulb 63, preferably at least five volts below such extinction potential. In the circuit shown, adjustment of such plate potential may be made independently of the remainder of the circuit by varying the potential of the pentode screen 33, either by a suitable tap on the B-supply or by connecting the screen to B plus through the resistor 47 which acts as a voltage-dropping resistor and which is suitably selected or adjusted to accomplish the desired result. The condenser 48, connected around the resistor 47, permits good amplification from the pentode section and preferably should have a capacity large enough to maintain the screen 33 at approximately the desired potential throughout the extended interval of broadened pulse duration, although a smaller capacity can be used since the principal purpose of this capacity is to maintain the voltage amplification high during the initiating pulse rise time. In fact, both resistor 47 and condenser 48 can be omitted if other means are employed to adjust the no-signal pentode plate potential.

The instrument is initially adjusted with the selector switches 21, 37, 56 and 68 in the third position, representing the least sensitive range, typically 20 mr./hr. The G. M. tube is then placed in a field of radiation of 20 mr./hr. and the plate load resistor 41 is adjusted until the meter 65 reads full scale. The capacity from the plate 31 to the diode section is, in this case, the stray capacity of the tube 30 and the circuit.

The selector switches 21, 37, 56 and 68 are then turned to the second or check position. This deenergizes the cathode 35, cutting off the tube plate current, and connects the resistors 70 and 71 in shunting relationship with the meter 65. It is desirable to shunt the meter for this adjustment, because the completely cut-off plate current condition is never encountered during radiation measurement; consequently, the meter scales would otherwise be more crowded toward the zero end of the scale than necessary. The resistor 71 is then adjusted until the meter 65 again reads full scale.

The other sensitivity positions (the fourth and fifth positions of the selector switches 21, 37, 56 and 68) are calibrated by placing the G. M. tube in known-intensity fields of radiation and selecting or adjusting the capacity of the condensers 57 and 58 to secure accurate readings of the field intensities or rate of reception of pulses by the G. M. tube in such fields. Thereafter, it is usually not necessary to readjust these condensers even if a replacement of tubes becomes necessary.

When the instrument is in service, it is usually desirable first to move the selector switches 21, 37, 56 and 68 into the second or check position to permit adjustment or compensation for any changes of amplifier battery voltages by variation of resistor 41. The current drawn by the neon bulb 63 is primarily a function of the battery voltage and the resistance offered by resistors 40 and 41. While in this second position the resistor 41 is adjusted to bring the current through the neon bulb 63 and the meter 65 to the full scale value. This adjustment also compensates for minor changes in the firing characteristics of the neon bulb 63.

It will be clear that the instrument or circuit can be employed in measuring frequency or pulse-rate in various applications. It is necessary only to convert the incoming undulations to negative pulses or employ negative swings of the incoming signal to secure the broadened output pulses which are readily measureable. However, the circuit is particularly well adapted to the measurement of radiation intensity and represents a relatively simple and responsive device for giving accurate visible or audible indications of radiation intensity.

While the preferred circuit has been shown it will be apparent to those skilled in the art that various changes and modifications may be made in the circuit components without departing from the spirit of the invention.

I claim as my invention:

1. In a circuit responsive to negative pulses, the combination of: an electron tube including a plate, a cathode, and a grid; a plate-energizing output circuit adapted to be supplied from a source of plate potential and including a voltage-dropping means connected between said plate and said source for normally delivering to the plate a voltage less than the voltage of said source by an amount corresponding to the voltage drop across said voltage-dropping means due to flow of plate current; means for normally establishing a potential on said grid providing for said plate current flow; an input circuit receiving said negative pulses and connected between said cathode and said grid for delivering said pulses to said grid to swing the potential of said grid in a negative direction to decrease the plate current and increase the plate voltage toward the voltage of said source, each pulse thus tending to establish in said output circuit an undulation ceasing only when the potential of said grid rises to its original value; and means for prolonging the time length of the undulation in said output circuit beyond the time length of the negative pulse that created it, said means including energy-transferring means interconnecting said input and output circuits for transferring from the latter to the former a portion of the energy in the latter to maintain the potential of said grid below said original value for a time longer than the length of the undulation-initiating negative pulse, said energy transferring means including an asymmetrical impedance between said cathode and said plate and capacitively connected to said plate at least by the stray capacity from said plate to the asymmetrical impedance to permit transient current flow through said impedance to said cathode while relatively impeding a reverse flow of current, the stray capacity representing a condenser means which becomes charged upon said increase in plate voltage, and a time delay impedance means having at least a portion connected between said asymmetrical impedance and said grid to transmit a negative signal to said grid upon discharge of said condenser means.

2. A circuit as defined in claim 1, in which said asymmetrical impedance is a thermionic diode providing a diode plate, and in which said circuit includes a condenser connecting said diode plate to said plate of said electron tube to supplement said stray capacity in transferring energy from the latter plate to the diode plate, said condenser becoming charged upon said increase in plate voltage and tending to discharge when said plate voltage stops rising, said diode preventing such discharge therethrough.

3. In a circuit responsive to negative pulses, the combination of: an electron tube providing a plate, a cathode, and a grid; an output circuit connected to said plate for delivering to said plate a voltage which lessens with increase in plate current; an input circuit receiving said negative pulses and connected to said grid to supply said negative pulses thereto, each pulse swinging the potential of said grid in a negative direction and effecting an increase in plate voltage, thus establishing in said output circuit an undulation ceasing only when the potential of said grid again rises to its original value; a condenser; means including an asymmetric impedance for connecting said condenser between said plate and said cathode through a low impedance path to cause said condenser to become charged upon rise of said plate voltage, said asymmetric impedance means preventing discharge of said condenser through said asymmetric impedance means; a resistance means and means for connecting same to discharge said condenser when said plate voltage begins to decrease; and means for connecting a portion of said resistance means between said asymmetric impedance means and said grid to impress on said grid during the time said condenser is discharging a negative potential holding said grid near cut-off value for a time greater than the length of said pulse to prolong said undulation in said output circuit into a readily measurable undulation.

4. In a circuit responsive to negative pulses, the combination of: an electron tube providing a plate, a cathode, and a grid; an output circuit connected to said plate for delivering to said plate a voltage which lessens with increase in plate current; an input circuit connected to said grid for supplying to said grid a zero signal potential providing for flow of plate current and for receiving said negative pulses and delivering said negative pulses to said grid, each pulse swinging said grid in a negative direction and effecting an increase in plate voltage, thus establishing in said output circuit an undulation ceasing only when the potential of said grid again rises about to said zero signal potential; a condenser; a diode including a diode plate; and means for connecting said condenser between said plates for transiently charging said condenser during rise in said plate voltage, said diode preventing subsequent discharge of said condenser therethrough when said plate voltage starts to fall; said input circuit including auxiliary means through which said condenser discharges to establish a negative potential during said discharge, said auxiliary means including means connected between said diode plate and said grid for enabling said grid to be carried negative with respect to said diode plate when said negative pulses are delivered to said grid and for applying at least a portion of said negative potential to said grid to hold said grid negative with respect to said zero signal potential for a prolonged time.

5. A circuit as defined in claim 4, in which said auxiliary means includes a resistor through which said condenser discharges and connected in circuit therewith, the length of said undulation being determined by the time constant of the circuit including said condenser and said resistor.

6. A circuit as defined in claim 5, including means for changing said time constant to produce undulations of varying time length from said negative pulses.

7. In a circuit responsive to negative pulses, the combination of: a return conductor; an electron tube providing a plate, a cathode, and a grid; a plate energizing circuit connected between said plate and said return conductor; an input circuit connected between said grid and said cathode, said input circuit receiving said negative pulses; means for transferring a portion of the energy from said plate-energizing circuit to said grid circuit, said means including means for producing undulations in plate voltage in step with the reception of said negative pulses but of longer time length than said negative pulses; a gaseous discharge tube; a meter means; and means for connecting said gaseous discharge tube and said meter means in series relationship between said plate and said return conductor, said gaseous conductor having break-down and extinction potentials within the range of voltage excursions of said plate.

8. In a circuit responsive to negative pulses, the combination of: a return conductor; an electron tube providing an amplifying section and a diode section, said amplifying section including a plate, a cathode, and a control grid for controlling electron flow from said cathode to said plate, said diode section including a diode plate receiving electrons from said cathode; means connected to said return conductor for heating said cathode; an input circuit for delivering negative pulses to said grid, each pulse swinging said grid negative toward cut-off, said input circuit including a grid resistor connected between said grid and said cathode to apply a zero-signal potential to said grid; a plate-energizing circuit interconnecting said plate and said return conductor and including a source of potential and a plate resistor for applying to said plate a potential less than said source by an amount corresponding to the voltage drop through said plate resistor, whereby the potential of said plate rises toward the potential of said source when said grid is swung from zero-signal potential toward cut-off; a pulse-isolating resistor connected between said diode plate and said grid; a condenser means connected between said plate of said amplifier section and said diode plate, said condenser being charged by said rise in plate potential and discharging through said pulse-isolating resistor upon subsequent decrease in plate potential to maintain said grid below zero-signal potential for a time interval greater than the length of any of said negative pulses, thereby producing an undulation in plate potential with the receipt of each negative pulse and of a time length longer than such negative pulse; a gaseous discharge tube; a meter means; and means for connecting said gaseous discharge tube and said meter means in series relationship between said plate of said amplifying section and said return conductor, the break-down and extinction potentials of said gaseous discharge tube being within the range of excursions of the potential of the plate of said amplifying section.

9. A circuit as defined in claim 8 adapted to be connected to a radiation-responsive element and including input terminals for receiving negative pulses from said radiation-responsive element, one of said input terminals being connected to said return conductor, an auxiliary source of potential connected between said plate-energizing circuit and the other of said input terminals, and a condenser connected between said other input terminal and said grid for isolating from said grid the potential of said auxiliary source while transmitting to said grid the negative pulses from said input terminal.

10. A device for converting negative electrical pulses which may vary in length or intensity or both into substantially uniform pulses, which comprises: an electron tube having a plate, a cathode and a control grid; an output circuit including a voltage dropping means and terminals adapted to be connected to a voltage source, said voltage dropping means and said terminals being connected in series between said cathode and said plate to provide a zero signal positive potential on said plate lower than the voltage of said source when current flows in said output circuit; an input circuit connected between said cathode and said grid for applying a zero-signal potential to said grid providing a current flow in said output circuit and for delivering said negative pulses to said grid to cause the positive potential of said plate to increase and thereafter decrease; coupling means between said plate and said input circuit for impressing a negative potential on said grid when the positive potential of said plate is decreasing to delay return of the potentials of said grid and plate to zero-signal potentials and produce substantially uniform pulses in said output circuit, said coupling means including asymmetric impedance means separate from said grid for preventing a positive potential from being impressed on said grid when the positive potential of said plate is increasing.

11. A device in accordance with claim 10, in which said input circuit maintains a sufficiently low zero-signal potential on said grid that the initial portions of the negative pulses drive said grid to cut-off.

12. A device in accordance with claim 10, in which said device includes means for integrating and measuring the rate of production of the pulses in the output circuit so as to measure the rate of receipt of said negative pulses by said device.

13. A device for measuring the rate of reception of negative electrical pulses which may vary in length or intensity or both, which comprises: an electron tube having a plate, a cathode and a control grid; an output circuit including a voltage source and a voltage dropping means connected between said cathode and said plate to provide a zero signal positive potential on said plate lower than the voltage of said source when current flows in said output circuit; an input circuit for applying a zero-signal potential to said grid providing a current flow in said output circuit and for delivering said pulses to said grid to cause the positive potential of said plate to increase and thereafter decrease; coupling means for capacitively coupling said plate to said input circuit; an asymmetric impedance separate from said grid providing a low impedance path for current flowing to said cathode from said coupling means when the positive potential of said plate is increasing to prevent driving the potential of said grid in a positive direction, said asymmetric impedance providing a high impedance for reverse current flow when said plate potential is decreasing to cause the potential of said grid to be held negative with respect to said zero-signal potential and delay the return of said grid and plate potentials to zero-signal potentials and thereby produce substantially uniform pulses in said output circuit; and means for integrating and measuring the rate of production of said pulses in said output circuit.

14. A device in accordance with claim 13, in which said asymmetric impedance comprises a rectifier means passing current freely to said cathode from said coupling means but substantially blocking reverse flow of current.

15. A device in accordance with claim 13, in which said asymmetric impedance comprises a diode plate adjacent said cathode.

16. A device in accordance with claim 15, in which the capacitive coupling comprises the distributed capacitance between said first mentioned plate and said diode plate and the circuits connected thereto.

17. A device in accordance with claim 13, in which the capacitance of said capacitive coupling means is charged by current flow through said asymmetric impedance when the positive potential of said plate is increasing, and in which said input circuit includes a resistor through which said capacitance discharges when the positive potential of said plate is decreasing, to provide a time delay circuit increasing the time length of the pulses in said output circuit.

18. A device for measuring the rate of reception of negative electrical pulses which may vary in length or intensity or both, which comprises: an electron tube having a plate, cathode and a control grid; an output circuit including a voltage source and a voltage dropping means connected between said cathode and said plate to provide a positive potential on said plate lower than the voltage of said source when current flows in said output circuit; an input circuit for applying a zero-signal potential to said grid providing a current flow in said output circuit and for delivering said pulses to said grid to cause the positive potential of said plate to increase, said positive potential thereafter decreasing; coupling means between said plate and said input circuit for impressing a negative potential on said grid when the positive potential of said plate is decreasing to delay return of the potentials of said grid and plate to said zero-signal potentials and produce substantially uniform pulses in said output circuit, said coupling means including means for preventing a positive potential from being impressed on said grid when the positive potential of said plate is increasing; a gaseous discharge tube circuit in said output circuit and connected between said plate and said cathode, said gaseous discharge tube circuit including a gaseous discharge tube having an ignition potential above the zero-signal potential on said plate but within the potential range of said plate when the initial portion of a negative pulse is delivered by said input circuit to said grid, whereby said gaseous discharge tube becomes conducting during the initial portion of said negative pulse to increase the current through said voltage dropping means and thereby lower said plate potential and cause said coupling means to impress a negative potential on said grid, the potential across said gaseous discharge tube dropping below the extinction potential of said gaseous discharge tube after a time delay whereby current pulses of substantially uniform time length and amplitude are produced in said gaseous discharge tube circuit; and means for measuring the average current flowing in said gaseous discharge tube circuit.

19. A device in accordance with claim 18, in which said means for preventing a positive potential from being impressed on said grid when the positive potential of said plate is increasing comprises an asymmetric impedance providing a low impedance path for current flowing to said cathode when the positive potential of said plate is increasing to prevent driving the potential of said grid in a positive direction, said asymmetric impedance providing a high impedance for reverse current flow when said plate potential is decreasing to cause the potential of said grid to be held negative with respect to said zero-signal potential and delay the return of said grid and plate potentials to zero-signal potentials.

20. A device in accordance with claim 19, in which said asymmetric impedance comprises a diode plate adjacent said cathode.

21. A device for measuring the rate of reception of negative electrical pulses which may vary in length or intensity or both, which comprises: an electron tube having a plate, a cathode and a control grid; an output circuit including a voltage source and a voltage dropping means connected between said cathode and said plate to provide a positive potential on said plate lower than the voltage of said source when current flows in said output circuit; an input circuit for applying a zero-signal potential to said grid providing a current flow in said output circuit and for delivering said pulses to said grid to cause the positive potential of said plate to increase, said positive potential thereafter decreasing; coupling means between said plate and said input circuit for impressing a negative potential on said grid when the positive potential of said plate is decreasing to delay return of the potentials of said grid and plate to said zero-signal potentials and produce substantially uniform pulses in said output circuit, said coupling means including means for preventing a positive potential from being impressed on said grid when the positive potential of said plate is increasing, said coupling means comprising a time delay circuit; a gaseous discharge tube circuit in said output circuit and connected between said plate and said cathode, said gaseous discharge tube circuit including a serially connected resistor means and a gaseous discharge tube, said gaseous discharge tube having an ignition potential above the zero-signal potential on said plate but within the potential range of said plate when the initial portion of a negative pulse is delivered by said input circuit to said grid, whereby said gaseous discharge tube becomes conducting during the initial portion of said negative pulse to increase the current through said voltage dropping means and thereby lower said plate potential and cause said coupling means to impress a negative potential on said grid, the potential across said gaseous discharge tube dropping below the extinction potential of said gaseous discharge tube after a time delay whereby current pulses of substantially uniform time length and amplitude are produced in said gaseous discharge tube circuit; and an electric measuring means connected across said resistor means and responsive to the pulses in said gaseous discharge tube circuit.

22. A device in accordance with claim 21, in which said coupling means includes a plurality of condenser means of different capacitance, and a selector switch for selectively connecting said condenser means in said coupling means to change the time constant of said time-delay circuit and thus change the length of the pulses in said output circuit and to which said electric measuring means is responsive.

EVERETT W. MOLLOY.

REFERENCES CITED

The following references are of record in the file of this patent:

UNITED STATES PATENTS

| Number | Name | Date |
|---|---|---|
| 2,412,485 | Whitely | Dec. 10, 1946 |

FOREIGN PATENTS

| Number | Country | Date |
|---|---|---|
| 582,758 | Great Britain | Nov. 27, 1946 |
| 587,351 | Great Britain | Apr. 23, 1947 |

OTHER REFERENCES

Kip et al.: Review of Scientific Instruments, vol. 17, No. 9, Sept. 1946, pp. 323–325.